United States Patent
Narita et al.

(10) Patent No.: US 10,262,807 B2
(45) Date of Patent: Apr. 16, 2019

(54) ELECTRODE FOIL, WINDING CAPACITOR, ELECTRODE FOIL MANUFACTURING METHOD, AND WINDING CAPACITOR MANUFACTURING METHOD

(71) Applicant: NIPPON CHEMI-CON CORPORATION, Tokyo (JP)

(72) Inventors: Yoshiyuki Narita, Tokyo (JP); Kazuhiro Nagahara, Tokyo (JP); Atsushi Tanaka, Tokyo (JP); Shoji Ono, Tokyo (JP)

(73) Assignee: NIPPON CHEMI-CON CORPORATION, Tokyo (JP)

( * ) Notice: Subject to any disclaimer, the term of this patent is extended or adjusted under 35 U.S.C. 154(b) by 0 days.

(21) Appl. No.: 16/029,940

(22) Filed: Jul. 9, 2018

(65) Prior Publication Data
US 2018/0315552 A1 Nov. 1, 2018

Related U.S. Application Data

(63) Continuation of application No. PCT/JP2017/013661, filed on Mar. 31, 2017.

(51) Int. Cl.
*H01G 9/00* (2006.01)
*H01G 9/04* (2006.01)
(Continued)

(52) U.S. Cl.
CPC ........... *H01G 9/055* (2013.01); *H01G 9/0032* (2013.01); *H01G 9/0036* (2013.01); *H01G 9/048* (2013.01);
(Continued)

(58) Field of Classification Search
CPC .... H01G 9/055; H01G 9/0036; H01G 9/0032; H01G 9/145; H01G 9/151; H01G 9/048
See application file for complete search history.

(56) References Cited

U.S. PATENT DOCUMENTS 3,327,184 A * 6/1967 Valley ............... H01G 4/22
29/25.42
4,151,581 A * 4/1979 Bernard .............. H01G 9/022
361/512
(Continued)

FOREIGN PATENT DOCUMENTS

JP 6314637 A 11/1994
JP 6314638 A 11/1994
(Continued)

OTHER PUBLICATIONS

Japanese Office Action dated Jan. 22, 2018 corresponding to application No. 2017-155084.
(Continued)

*Primary Examiner* — Eric W Thomas
(74) *Attorney, Agent, or Firm* — Nath, Goldberg & Meyer; Jerald L. Meyer

(57) ABSTRACT

An electrode foil that progresses an enlargement of the surface area of a dielectric film and that barely causes cracks which would even break a core part at the time of winding, a winding capacitor obtained by winding the electrode foil, an electrode foil manufacturing method, and a winding capacitor manufacturing method are provided. An electrode foil is formed of a belt-like foil, and has a surface enlarged part, a core part, and a plurality of separation parts. The surface enlarged part is formed on the surface of the foil, and the core part is a part remained when excluding the surface enlarged part within the foil. The separation part extends in a width direction of the belt in the surface enlarged part, dividing the surface enlarged part. The plurality of separation parts share bending stress when the electrode foil is wound, preventing concentration of stress.

9 Claims, 8 Drawing Sheets

(51) Int. Cl.
    *H01G 9/055*    (2006.01)
    *H01G 9/048*    (2006.01)
    *H01G 9/145*    (2006.01)
    *H01G 9/15*     (2006.01)
    *H01G 13/02*    (2006.01)

(52) U.S. Cl.
    CPC .............. *H01G 9/145* (2013.01); *H01G 9/151* (2013.01); *H01G 13/02* (2013.01)

(56) References Cited

U.S. PATENT DOCUMENTS

| | | | | |
|---|---|---|---|---|
| 4,228,481 | A | * 10/1980 | DiNicola | ................ H01G 4/22 |
| | | | | 361/303 |
| 2012/0268073 | A1 | 10/2012 | Morioka et al. | |

FOREIGN PATENT DOCUMENTS

| JP | 2007149759 A | 6/2007 |
|---|---|---|
| JP | 200962595 A | 3/2009 |
| JP | 2013153024 A | 8/2013 |
| JP | 2014135481 A | 7/2014 |

OTHER PUBLICATIONS

The Extended European Search Report dated Nov. 30, 2018 corresponding to application No. 17775559.2-1204.
Decision of Refusal dated Feb. 14, 2019 corresponding to Japanese application No. 2017-541141.

* cited by examiner

ELECTRODE FOIL, WINDING CAPACITOR, ELECTRODE FOIL MANUFACTURING METHOD, AND WINDING CAPACITOR MANUFACTURING METHOD

TECHNICAL FIELD

The present disclosure relates to an electrode foil used for a winding capacitor.

BACKGROUND ART

Electrolytic capacitors, in which a gap is filled with an electrolyte in order to closely contact a dielectric film of a positive electrode with an opposing electrode, include a non-solid electrolytic capacitor in which an electrolyte is a liquid, a solid electrolytic capacitor in which an electrolyte is a solid, a hybrid type electrolytic capacitor in which an electrolyte is in a liquid and in a solid, and a bipolar electrolytic capacitor in which a dielectric film is formed on both electrodes. An electrolytic capacitor is formed by impregnating a capacitor element in an electrolyte, the capacitor element has a configuration in which a positive electrode foil in which a dielectric film is formed on a valve metal foil, such as aluminum, and a negative electrode foil which is made of a metal foil of the same metal or a different metal are positioned to face each other, and a separator is interposed between the positive electrode foil and the negative electrode foil.

The electrostatic capacitance of an electrolytic capacitor is proportional to a surface area of the dielectric film. In general, a surface enlargement process, such as etching, is performed on the electrode foil of an electrolytic capacitor, and a chemical treatment is performed on the surface enlarged part, which was subjected to the enlargement process, to have a dielectric film with a large surface area. In recent years, in order to further increase the electrostatic capacitance of an electrolytic capacitor, enlargement has progressed from the surface of the electrode foil to a deeper part.

In other words, in an electrolytic capacitor, the core part of the electrode foil is tending to be thinner. The surface expansion part having the dielectric film has flexibility and stretchability lower than the core part. Therefore, an electrode foil that had the surface enlargement of the dielectric film has decreased flexibility and stretchability due to thinning of the residual core part having high flexibility and stretchability.

Here, as an electrolytic capacitor using the electrode foil, a form of a winding capacitor may be used in order to reduce the size and increase a capacitance. The capacitor element of a winding capacitor is obtained by laminating the positive electrode foil and the negative electrode foil with a separator therebetween and winding them in a cylindrical form. In recent years, measures for increasing a surface area of a dielectric film have caused big problems with respect to winding properties of a winding capacitor.

That is, as shown in FIG. 10, when surface enlarged part 103, which surface enlargement was performed to, is chemically treated to form a dielectric film 105, the flexibility and stretchability of an electrode foil 101 decrease. Accordingly, the electrode foil 101 with decreased flexibility and stretchability may not be able to be deformed into a bow, and it may be difficult to curve smoothly and wind the electrode foil 101, bending some parts while winding. In particular, in the worst case, concentration of the bending stress during the winding may cause a crack 104 that breaks a core part 102. The crack 104 that breaks the core part 102 may induce bending of the electrode foil 101.

When the electrode foil 101 is wound with some parts bent, the diameter of the capacitor element increases. Therefore, in order to maintain the electrostatic capacitance of the winding capacitor, the size of the winding capacitor increases. Alternatively, in order to maintain the diameter of the winding capacitor, the electrostatic capacitance of the winding capacitor decreases. Otherwise, this is regarded as a defective product and the yield will deteriorate.

CITATION LIST

Patent Literature

Patent Document 1: JP 2007-149759 A

SUMMARY OF DISCLOSURE

Technical Problem

In order to solve the problems in the conventional art as described above, the present disclosure provides an electrode foil which the enlargement of a surface of a dielectric film is progressed and which the crack breaking a core part at the time of winding is difficult to occur, a winding capacitor which the electrode foil is wound, an electrode foil manufacturing method, and a winding capacitor manufacturing method.

Solution to Problem

In order to achieve the above objective, an electrode foil according to the present disclosure is formed of a belt-like foil, and includes surface enlarged parts that are formed on a surface of the foil; a core part which is a part remained when excluding the surface enlarged parts within the foil; and a plurality of separation parts that extends in a belt width direction in the surface enlarged parts and divides the surface enlarged parts.

The separation parts may extend to completely cross or partially cross the foil.

Four or more the separation parts may be provided in a range of 10 mm in a belt longitudinal direction.

The separation parts may be provided at intervals of an average pitch of 2.1 mm or less.

The separation parts may be provided at intervals of an average pitch of 1.0 mm or less.

The separation part may have a groove width of 0 to 50 μm when the foil is flat.

The separation parts may be formed by cracking the surface enlarged parts, and a groove width of when the foil is flat may be substantially zero.

A dielectric film may be provided on the surface of the surface enlarged parts and the separation parts.

A winding capacitor including the electrode foil that is wound thereon is an aspect of the present disclosure.

The winding capacitor includes a capacitor element obtained by winding the electrode foil, and the capacitor element may include a winding core part at a winding center, the electrode foil may be wound around the winding core part, and the separation parts may be formed at least on within a predetermined radius of a winding center-side including a start of the winding to the winding the core part.

In addition, in order to achieve the above objective, an electrode foil manufacturing method according to the present disclosure includes a step of forming surface enlarged parts on a surface of a belt-like foil; and a step of forming a plurality of separation parts that divide the surface enlarged parts extending in a belt width direction of the foil.

The method may further include a step of chemically treating the foil after the forming of the separation parts.

The method may further include a step of chemically treating the foil after the forming of the surface enlarged parts and before the forming of the separation parts.

The method may further include a step of chemically treating the foil after the forming of the surface enlarged parts and before the forming of the separation parts, and a step of chemically treating again the foil after the forming of the separation parts are formed.

In addition, in order to achieve the above objective, the winding capacitor manufacturing method according to the present disclosure includes an element forming step of forming a capacitor element by winding the foil, an electrolyte forming step of forming an electrolyte on the capacitor element; and an aging step of aging the capacitor element, in which the aging step is performed after the electrolyte is formed in the electrolyte forming step, or the electrolyte is formed in the aged capacitor element in the electrolyte forming step after the aging step.

Advantageous Effects of Disclosure

According to the present disclosure, since the bending stress during the winding disperses due to the presence of a plurality of separation parts, cracks that may break the core part during the winding are unlikely to occur, and a favorable winding with smooth curving is enabled.

DESCRIPTION OF EMBODIMENTS

An electrode foil and a winding capacitor according to embodiments of the present disclosure will be described below in detail. It should be noted that the present disclosure is not limited to the embodiments described below.

(Electrode Foil)

Figure 1:
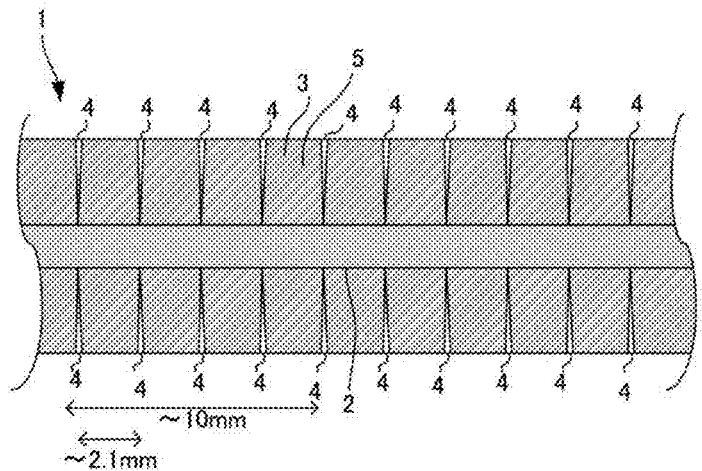
FIG. 1 shows a structure of an electrode foil according to the present embodiment, and (a) is a cross sectional view in a longitudinal direction and (b) is a top view.
Figure 1:
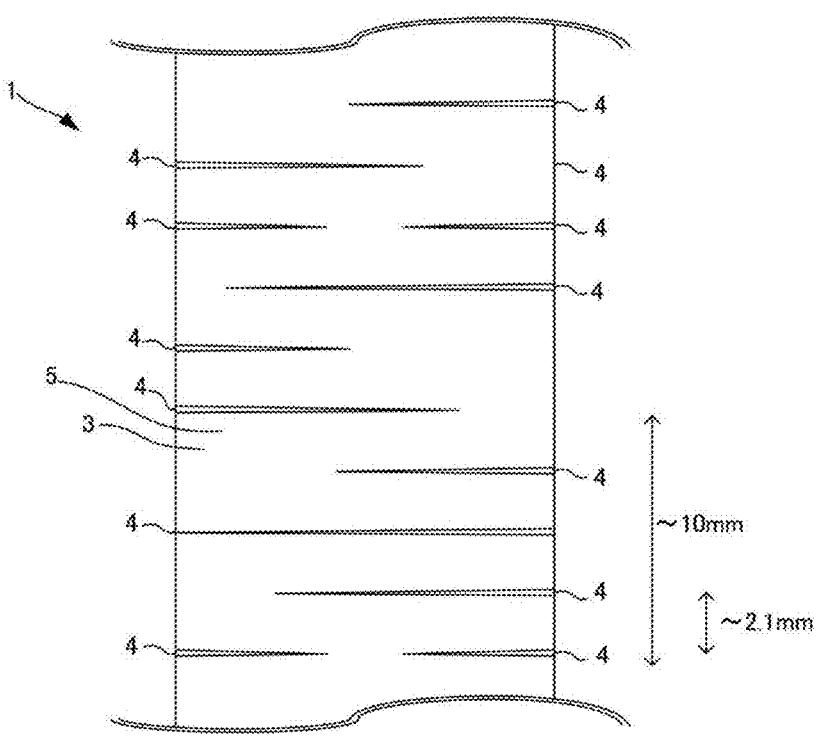

An electrode foil 1 shown in FIG. 1 is used for either or both a positive electrode foil of a winding capacitor and a negative electrode foil on which a dielectric film 5 is formed. A representative example of a winding capacitor is an electrolytic capacitor. As examples of the electrolytic capacitor, a non-solid electrolytic capacitor in which an electrolyte is a liquid and a dielectric film is formed on the positive electrode foil, a solid electrolytic capacitor in which an electrolyte is a solid and a dielectric film is formed on the positive electrode foil, a hybrid type electrolytic capacitor in which a liquid and a solid are included as an electrolyte, and a bipolar electrolytic capacitor in which a dielectric film is formed on both the positive electrode foil and the negative electrode foil can be cited.

The electrode foil 1 is made of a valve metal such as aluminum, tantalum, titanium, niobium, niobium oxide, and the like. A purity is desirably about 99.9% or more for the positive electrode foil and is desirably about 99% or more for the negative electrode foil, however, impurities such as silicon, iron, copper, magnesium, and zinc may be contained. As shown in FIG. 1, the electrode foil 1 is in a long length, surface enlarged parts 3 are formed on both sides, leaving a core part 2 at a center in a thickness direction, a plurality of separation parts 4 are formed on one side or both sides of the surface enlarged parts 3, and the dielectric film 5 is formed on the surface of the surface enlarged parts 3 and the separation parts 4.

The surface enlarged parts 3 has a porous structure. The porous structure is composed of tunnel-shaped pits, spongy pits, or gaps between dense powders. Typically, the surface enlarged parts 3 is formed by direct current etching or alternating current etching in which a direct current or an alternating current is applied in an acidic aqueous solution containing halogen ions such as hydrochloric acid or formed by vapor depositing or sintering metal particles and the like in a core part.

The electrode foils 1 include an electrode foil for a low voltage and an electrode foil for a medium and high voltage. In addition, the remaining part other than the surface enlarged parts 3 of the valve metal or a substrate to which metal particles and the like are adhered by vapor deposition or the like correspond to the core part 2. In other words, for example, an unetched layer or the substrate correspond to the core part 2. The thicknesses of the surface enlarged parts 3 and the core part 2 are not particularly limited, however, it is preferable that the thickness of the surface enlarged parts 3 on both sides is in a range of 40 to 200 μm as a whole and it is preferable that the thickness of the core part 2 is in a range of 8 to 60 μm.

The separation part 4 divides the surface enlarged parts 3 in a depth direction from the surface of the electrode foil 1 toward the core part 2. The separation part 4 may have any depths including a depth which the deepest part does not reach the core part 2, a depth which the deepest part just reaches the core part 2, and a depth which the deepest part breaks into the core part 2, as long as the separation part 4 does not completely divide the core part 2. In addition, the depths of all the separation parts 4 do not have to be the same.

The separation parts 4 are formed in a widthwise direction orthogonal to a belt longitudinal direction of the electrode foil 1. The separation parts 4 extend to completely cross or partially cross the electrode foil 1. That is, one separation part 4 may extend from one long side of the electrode foil 1 and reach the other long side. In addition, another separation part 4 may extend from one long side of the electrode foil 1 to a point before a center line of the foil or beyond the center line of the foil, and does not reach the other long side. Furthermore, another separation part 4 may extend from the other long side of the electrode foil 1 to a point before the center line of the foil or beyond the center line of the foil, and does not reach this one long side. The separation parts 4 formed in the widthwise direction may be connected to each other. The extending directions and lengths of all the separation parts 4 do not have to be the same.

The separation parts 4 are formed by cracking the surface enlarged parts 3, splitting the surface enlarged parts 3, notching the surface enlarged parts 3 in the thickness direction of the electrode foil 1, cutting out the surface enlarged parts 3, or digging the surface enlarged parts 3 in the thickness direction of the electrode foil 1. Therefore, examples of the actual state of the separation parts 4 include cracks, splits, notches, cutouts, or diggings. However, the form of the separation parts 4 is not particularly limited as long as the surface enlarged parts 3 is divided.

Groove width of the separation part 4 is from 0 to 50 μm when the electrode foil 1 is flattened without being curved. The groove width of the separation part 4 is a length in the longitudinal direction of the electrode foil 1 measured in the vicinity of a surface layer of the electrode foil 1. When the separation part 4 is formed by cracking, splitting, or notching, the groove width of the separation part 4 is substantially zero. Substantially zero refers to a state which interfaces of the separation parts 4 are at least partially in contact with each other when the electrode foil 1 is flattened without being bent. When the groove width of the separation part 4 is 50 μm or less, a large decrease in electrostatic capacitance of the winding capacitor due to a decrease in surface area of the dielectric coating film 5 can be prevented without the deterioration of the flexibility and stretchability of the electrode foil 1.

Here, as a formation method of the separation parts 4, for example, a physical method such as pushing the electrode foil 1 on a round bar, may be considered. In a formation method using a round bar, the core part 2 of the electrode foil 1 extends in the longitudinal direction, and as a result, the thickness of the core part 2 becomes thin. However, the thickness of the core part 2 is unlikely to be reduced when the groove width of the separation part 4 is 50 μm or less, and the flexibility and stretchability of the electrode foil 1 are improved. In this respect, the groove width of the separation parts 4 is preferably 50 μm or less.

In addition, four or more of the separation parts 4 are provided for each range of 10 mm in the belt longitudinal direction of the electrode foil 1. When the number of the separation parts 4 is small, even if a bending stress disperses in the separation parts 4 when the electrode foil 1 is wound, the stress applied to the separation parts 4 may be high, and cracks that break the core part 2 are likely to occur in the separation part 4. Intervals between the adjacent separation parts 4 may have an average pitch of 2.1 mm or less, and more desirably an average pitch of 1.0 mm or less. It is confirmed that, when the average pitch is 2.1 mm or less, an Erichsen value is higher compared to an electrode foil 1 in which no separation parts 4 are formed.

Here, the average pitch is calculated by selecting arbitrarily several cross sections in the longitudinal direction of the electrode foil 1, calculating average values of intervals of four separation parts 4 in series that are arbitrarily selected from photo of the cross sections, and further obtaining an average value of the average values. An interval between the separation parts 4 may be obtained by measuring in the vicinity of the surface of the electrode foil 1.

The separation parts 4 may be formed with a uniform average pitch or number within a unit range in the longitudinal direction of the electrode foil 1. In addition, the average pitch and number within a unit range may be changed by considering a curvature at the location where the separation parts 4 are formed when the electrode foil 1 is wound. This is because, when the curvature becomes smaller, that is, when it is wound on more outer circumference side during the winding, the bending stress decreases and a risk of the occurrence of cracks decreases.

For example, the separation parts 4 may be formed only on a part which the winding of the electrode foil 1 to a winding shaft starts. The part which the winding of the electrode foil 1 starts has a large curvature and cracks easily occurs. In addition, the average pitch may be set to be larger in proportion to a winding radius at apart where the separation parts 4 are positioned, and the number within a unit range may be reduced in inverse proportion to the radius. As the number of the separation parts 4 decreases, an influence to the electrostatic capacitance of the winding capacitor decreases.

It is desirable that the separation parts 4 are formed each of the surface enlarged part 3 of both sides, however, in consideration of stretching of the electrode foil 1 during the winding, the separation parts 4 may be formed on at least the surface enlarged parts 3 that receives tension on the outer side of the foil when the electrode foil 1 is wound.

The dielectric film 5 is formed by chemically treating the surface enlarged parts 3, and typically, an oxide film, which is formed by applying a voltage to a solution without halogen ions such as an aqueous solution of adipic acid, boric acid, or the like, is used.

Here, it is preferable that the dielectric film 5 is also formed on the inner surface of the separation parts 4. When the dielectric film 5 is also formed on the surface of the separation parts 4, the stability of the electrode foil 1 increases. In addition, it is because, it was found that when the dielectric film 5 is also formed on the inner surface of the separation parts 4, a quantity of electricity (A·s/F) required for an aging treatment to repair the dielectric film 5 decreases.

It is assumed that when the separation parts 4 are not formed on the electrode foil 1, since the bending stress is concentrated during the winding, a plurality of fine cracks occur and an unoxidized metal part is exposed to the inner surface of the cracks, however, when the separation parts 4 are formed, since the separation parts 4 share the bending stress, the bending stress is unlikely to be concentrated and the occurrence of cracks during the winding is minimized. When the occurrence of cracks during the winding is minimized, the unoxidized metal part (aluminum) is unlikely to be exposed from the inner surface of the cracks. That is, when a chemical treatment is performed after the separation parts 4 are formed, the dielectric film 5 is formed also on the inner surface of the separation parts 4, in other words, an unoxidized metal part is not exposed from a groove surface of the separation parts 4, and a quantity of electricity required for an aging treatment decreases.

In addition, when the separation parts 4 are formed before the chemical treatment, a manufacturing process of the electrode foil 1 can be smoothly realized. Therefore, preferably, after the surface enlarged parts 3 are formed, the separation parts 4 are formed before the chemical treatment. In this case, by forming thin oxide before the separation parts 4 are formed, the separation parts 4 are easily formed.

It should be noted that, even when the separation parts 4 are formed after the chemical treatment, a stress dispersion effect by the separation parts 4 during the winding can be obtained, so that cracks that break the core part during the winding are unlikely to occur and excellent winding with smooth curving is enabled. In addition, by performing the chemical treatment before the separation parts 4 are formed and performing the chemical treatment again after the separation parts 4 are formed, the dielectric coating film 5 can be formed on the surface of the separation parts 4.

(Winding Capacitor)

Figure 2:
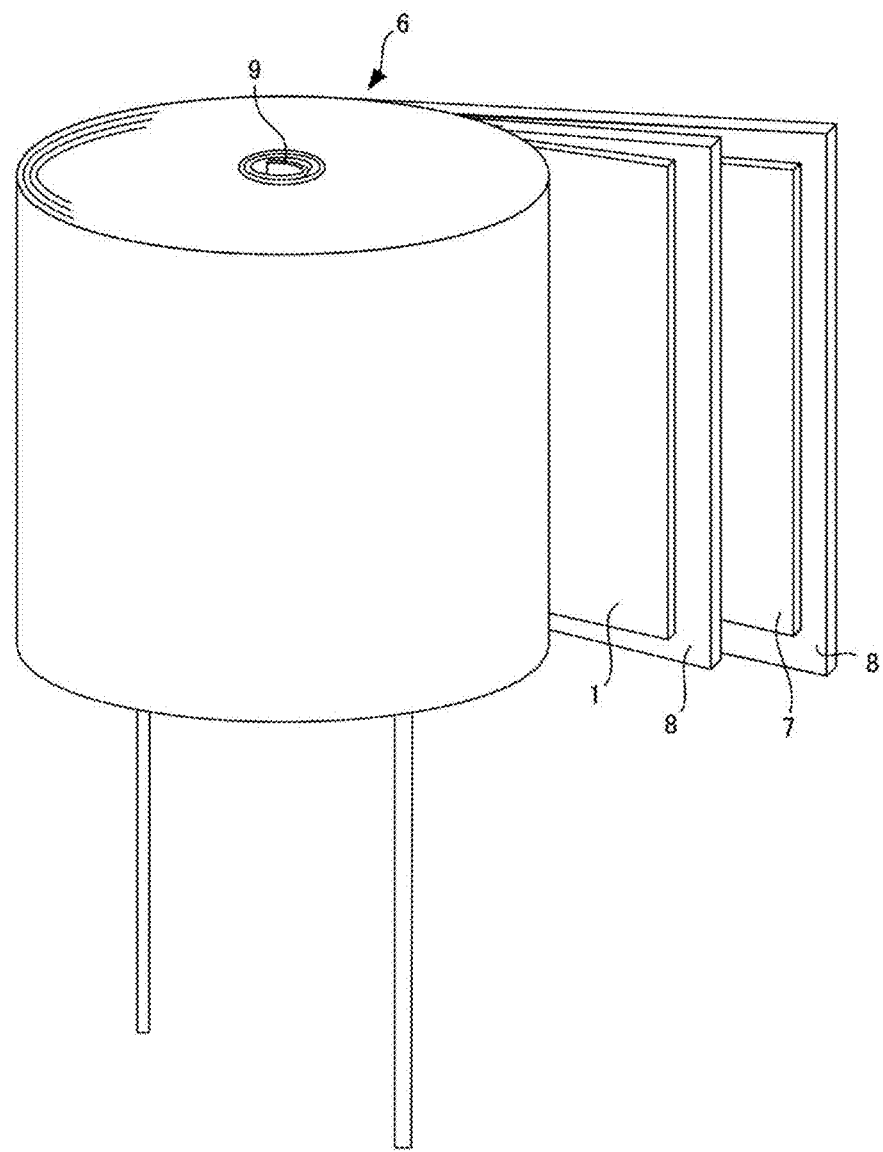
FIG. 2 is a perspective view showing a capacitor element included in a winding capacitor according to the present embodiment.

FIG. 2 is a schematic diagram showing a capacitor element 6 of the winding capacitor using the electrode foil 1, and an example of an aluminum electrolytic capacitor. In the capacitor element 6, the electrode foil 1 that is the positive electrode foil and a negative electrode foil 7 are laminated with a separator 8 such as paper or synthetic fibers therebetween. The separator 8 is laminated so that one end thereof protrudes from one end of the electrode foil 1 and the negative electrode foil 7. Then, the protruding separator 8 is wound first to form a winding core part 9, and layers of the electrode foil 1, the negative electrode foil 7, and the separator 8 are subsequently wound around the winding core part 9 that is a winding shaft.

In a case of producing an electrolytic capacitor, the capacitor element 6 formed in this manner is impregnated with an electrolyte solution, housed in an exterior case with a cylindrical shape and a bottom, a positive electrode terminal and a negative electrode terminal are drawn out and sealed with a sealing material, and an aging treatment is performed, so as to obtain a form of a winding capacitor. In addition, in a case of producing a solid electrolytic capacitor, the capacitor element 6 formed in this manner is subjected to an aging treatment, an electrolyte is then formed, housed in an exterior case with a cylindrical shape and a bottom, and a positive electrode terminal and a negative electrode terminal are drawn out and sealed with a sealing material, so as to obtain a form of a winding capacitor is obtained.

Here, when the separation parts 4 are formed on the electrode foil 1, the stress from the electrode foil 1 to the core part 2 occurring at the time of winding the capacitor element 6 is reduced. As a result, it has been found that, compared to winding an electrode foil in which the separation parts 4 are formed, a quantity of electricity (A·s/F) required for an aging treatment to repair the dielectric film 5 of the electrode foil 1 of the winding capacitor decreases.

Figure 3:
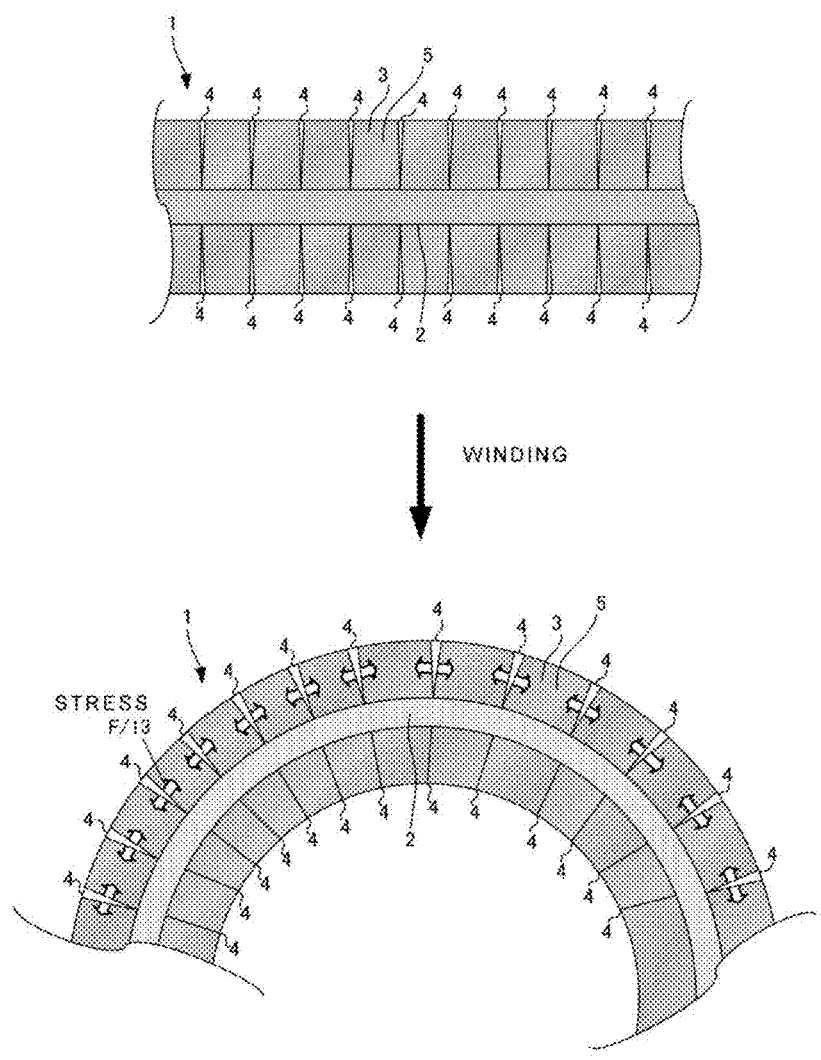
FIG. 3 is a cross-sectional view in a longitudinal direction of an electrode foil including separation parts according to the present embodiment.

FIG. 3 is a schematic diagram showing a state of the electrode foil 1 wound around the capacitor element 6. In the electrode foil 1 of the present embodiment, the plurality of the separation parts 4 share and receive the bending stress, and the bending stress disperses in each of the separation parts 4. Therefore, a stress that may break the core part 2 is prevented from being applied to the electrode foil 1, breaking of the core part 2 is avoided, and the electrode foil 1 is wound with a smooth curve without being bent.

Example 1

The electrode foil 1 shown in this embodiment was produced as follows. First, an aluminum foil with a thickness of 110 μm, a width of 10 mm, a length of 55 mm, and a purity of 99.9 weight % or more was used as a substrate. Then, the surface enlarged parts 3 were formed on both sides of the aluminum foil. Specifically, the aluminum foil was immersed in an acidic aqueous solution with a liquid temperature of 25° C. and containing hydrochloric acid at about 8 weight % as a main electrolyte, and an etching process was performed. In the etching process, a current of an alternating current of 10 Hz and a current density of 0.14 A/cm$^2$ was applied to the substrate for about 20 minutes, and both sides of the aluminum foil were enlarged.

After the etching process, the separation parts 4 were formed on the aluminum foil of which both sides had been etched. The separation parts 4 were formed to be orthogonal to a belt longitudinal direction of the aluminum foil. Specifically, as a physical processing method, the aluminum foil was pushed to a round bar of φ0.5 mm with a wrap angle indicating a size of an area which the round bar and the aluminum foil is in contact set to 180 degrees, to form the separation parts 4.

In addition, after the separation parts 4 were formed, the chemical treatment was performed, and the dielectric film 5 was formed on the surface of the surface enlarged parts 3 and the separation parts 4. Specifically, a voltage of 100 V was applied in chemical treatment solution of 15 weight % of adipic acid with a liquid temperature of 85° C. The voltage was applied for about 20 minutes, and the dielectric film 5 with a withstand voltage of about 100 V was formed.

Figure 4:
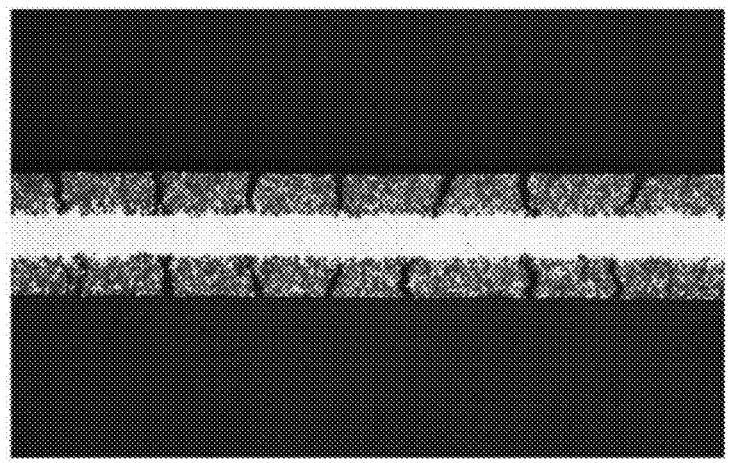
FIG. 4 is a cross sectional photo in a longitudinal direction of an electrode foil including separation parts according to the present embodiment according to Example 1.
Figure 5:
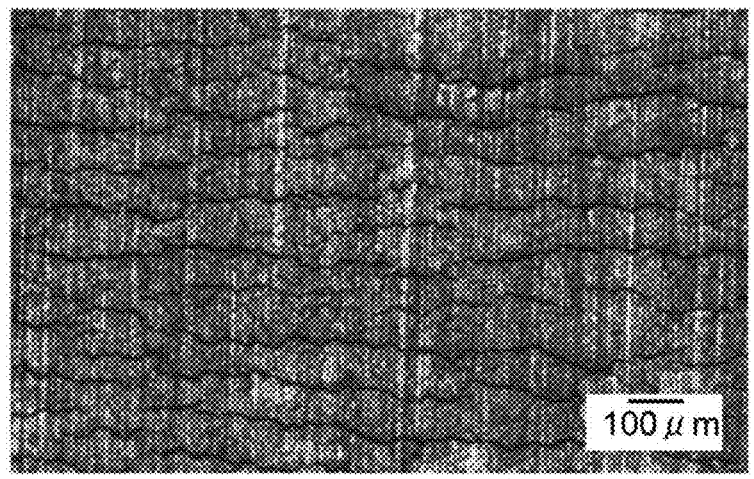
FIG. 5 is a photo showing a surface of an electrode foil including separation parts of the present embodiment according to Example 1, in which a direction on the long side of the photo is a width direction of the electrode foil and a direction on the short side of the photo is a longitudinal direction of the electrode foil.

As a result, as shown in FIG. 4 and FIG. 5, in the electrode foil 1 of Example 1, the surface enlarged parts 3 having the dielectric film 5 are present on both sides of the core part 2 with each thickness 36 μm, and the core part 2 with a thickness of 38 μm remained. The groove width of the separation parts 4 was 10 μm. The separation parts 4 were formed by cracking by the pushing of the round bar, an average pitch of the separation parts 4 was 70 μm and the number of the separation parts 4 per a range of 10 mm was 143.

Example 2

The same substrate as Example 1 was used, and the same etching process and chemical treatment as in Example 1 were performed. The process of forming the separation parts 4 was performed under the same conditions except that a round bar of φ6 mm was used. The etching process, the process of forming the separation parts 4, and the chemical treatment were performed in the order as same as Example 1.

As a result, the electrode foil 1 of Example 2 had the thickness of the core part 2, the surface enlarged parts 3, and the dielectric film 5 as same as Example 1. The separation parts 4 were formed by cracking, an average pitch of the separation parts 4 was 220 μm, and the number of the separation parts 4 per a range of 10 mm was 45.

Example 3

The same substrate as Examples 1 and 2 was used, and the same etching process and chemical treatment as Example 1 were performed. The process of forming the separation parts 4 was performed under the same conditions as Examples 1 and 2 except that a round bar of φ13 mm was used. As a result, in the electrode foil 1 of Example 3, the separation parts 4 were formed by cracking, an average pitch of the separation parts 4 was 950 μm, and the number of the separation parts 4 per a range of 10 mm was 10.

Example 4

The same substrate as Examples 1 to 3 was used, and the same etching process and chemical treatment as Examples 1 to 3 were performed. The process of forming the separation parts 4 was performed under the same conditions as Examples 1 to 3 except that a round bar of φ16 mm was used. As a result, in the electrode foil 1 of Example 3, the separation parts 4 were formed by cracking, an average pitch of the separation parts 4 was 2100 μm, and the number of the separation parts 4 per a range of 10 mm was 4.

Example 5

The same etching process and chemical treatment as Examples 1 to 4 were performed. The process of forming the separation parts 4 was performed under the same conditions as Examples 1 to 4 except that a round bar of φ22 mm was used. As a result, in the electrode foil 1 of Example 3, the separation parts 4 were formed by cracking, an average pitch of the separation parts 4 was 3100 μm, and the number of the separation parts 4 per a range of 10 mm was 3.

Comparative Example 1

Figure 6:
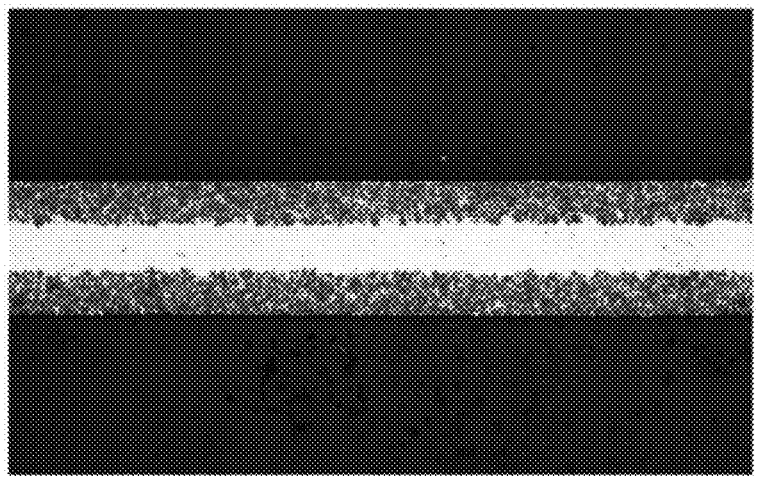
FIG. 6 is a cross sectional photo in a longitudinal direction of an electrode foil according to Comparative Example 1.

The same substrate as Examples 1 to 5 was used, and the same etching process and chemical treatment as Examples 1 to 5 were performed. However, the process of forming the separation parts 4 was omitted and no separation parts 4 were formed. As a result, as shown in FIG. 6, as Examples 1 to 5, an electrode foil of Comparative Example 1 had the surface enlarged parts 3 on both sides of the core part 2, the surface enlarged parts 3 has the dielectric film 5, the thickness of each of the surface enlarged parts 3 having the coating film 5 was 36 μm, and the thickness of the core part 2 was 38 μm.

(Erichsen Test)

An Erichsen test was performed on the electrode foils 1 of Examples 1 to 5 and the electrode foil of Comparative Example 1. In the Erichsen test, the electrode foils 1 of Examples 1 to 5 and the electrode foil of Comparative Example 1 were sandwiched between a die holder with an inner diameter of 33 mm and a blank holder at 10 kN, and pushed with a punch having a chisel shape. The chisel-shaped punch had a width of 30 mm and a tip part that is a spherical surface of φ4 mm in a cross-sectional view. A chisel part of the punch was pushed in a direction orthogonal to the belt longitudinal direction of the electrode foil 1. A pushing speed of the punch was 0.5 mm/min.

Figure 7:
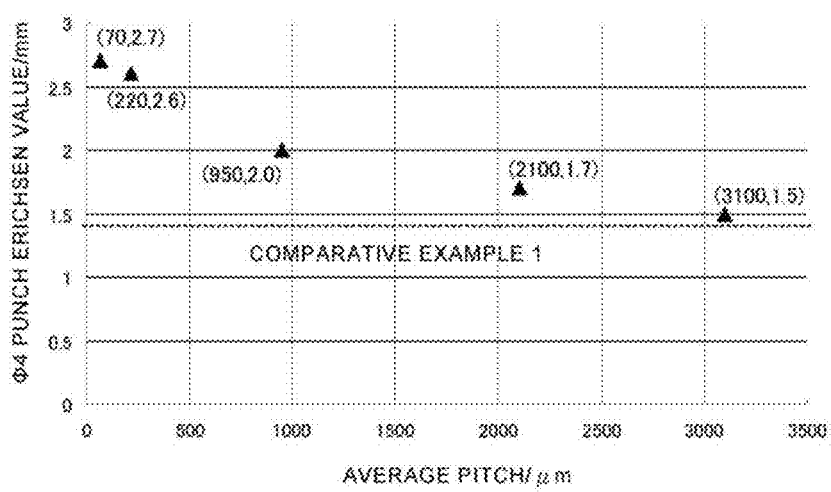
FIG. 7 is a graph showing Erichsen test results of Example 1 to 5 and Comparative Example 1.

The results of the Erichsen test are shown in FIG. 7. FIG. 7 is a graph in which the horizontal axis represents an average pitch of the separation parts 4 and the vertical axis represents an Erichsen value. As shown in FIG. 7, the Erichsen value of Comparative Example 1 was 1.4 mm, while the Erichsen value of Example 5 was 1.5 mm. That is, it can be understood that, by providing the separation parts 4, the bending stress during the winding is dispersed, and the flexibility and stretchability of the electrode foil 1 is improved.

In addition, when an average pitch of the separation parts 4 was 2100 μm or less, the Erichsen value was 1.7 mm or more, and there was a clear difference compared to when no separation parts 4 were formed. That is, it can be understood that, by providing the separation parts 4 at an average pitch of 2100 μm or less, the bending stress during the winding was excellently dispersed and excellent flexibility and stretchability were given to the electrode foil 1.

In particular, when an average pitch of the separation parts 4 was 950 μm or less, the Erichsen value was 2.0 mm or more, which was a significantly excellent result compared to when no separation parts 4 were formed. That is, it can be understood that, by providing the separation parts 4 at an average pitch of 950 μm or less, the bending stress during the winding was very excellently dispersed, and very excellent flexibility and stretchability were given to the electrode foil 1. Further, when an average pitch of the separation parts 4 was 220 μm or less, the Erichsen value was 2.6 mm or more, which was a significantly excellent result compared to when no separation parts 4 were formed.

(Winding Test)

Figure 8:
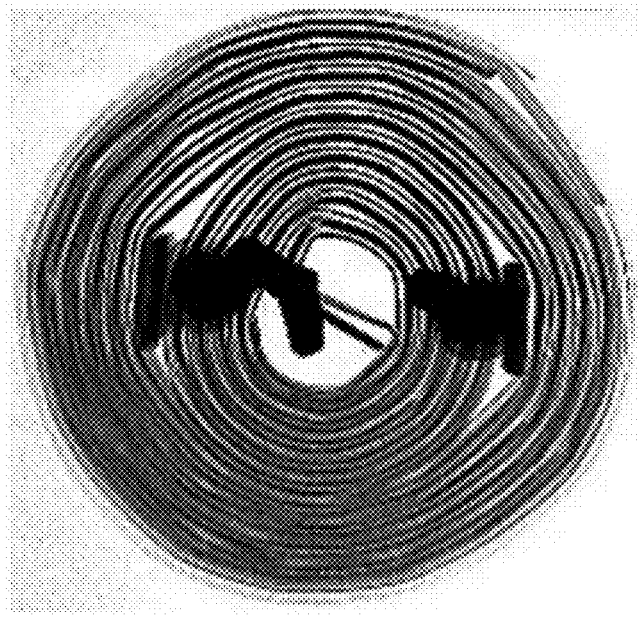
FIG. 8 shows photos of capacitor elements on which Example 1 and Comparative Example 1 were wound.
Figure 8:
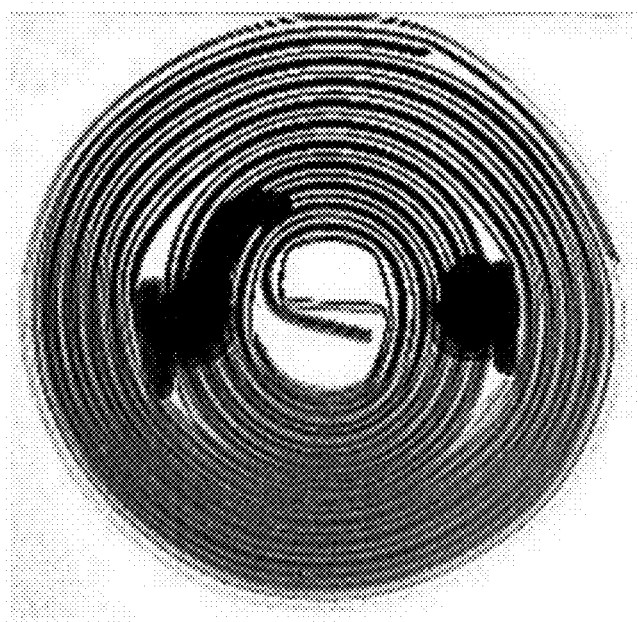

The electrode foil 1 of Example 1 and the electrode foil of Comparative Example 1 were actually wound to form the capacitor element 6. The wound electrode foil 1 of Example 1 and the wound electrode foil of Comparative Example 1 both had a size of 5.6 mm in width and 125 mm in length. The results are shown in FIG. 8. FIG. 8 shows photos of the wound electrode foil 1 of Example 1 and the wound electrode foil of Comparative Example 1. As shown in (a) of FIG. 8, it can be understood that, when the electrode foil of Comparative Example 1 was wound, many bents occurred at parts in the vicinity of the winding core part 9. In addition, it can be understood that many bents occurred in parts in the vicinity of an intermediate layer which was away from the winding core part 9 and had a large curvature. In addition, it can be understood that bents partly occurred in the vicinity of the outer circumferential surface of the capacitor element 6.

On the other hand, as shown in (b) of FIG. 8, it can be understood that, when the electrode foil 1 of Example 1 was wound, no bents occurred not only in the vicinity of the outer circumferential surface of the capacitor element 6 but also in the vicinity of the winding core part 9, and the electrode foil 1 was curved smoothly and wound.

Therefore, as shown in (a) of FIG. 8, the diameter of the capacitor element 6 which the electrode foil with the same length was wound increased to 7.36 mm in Comparative Example 1, on the other hand, as shown in (b) of FIG. 8, the radius of the capacitor element 6 which the electrode foil 1 with the same length was wound was within 7.10 mm in Example 1.

(Aging Evaluation)

The electrode foil 1 of Example 1 and the electrode foil of Comparative Example 1 were wound as a positive electrode foil to form the capacitor element 6. The electrode foil 1 of Example 1 and the electrode foil of Comparative Example 1 both had a size of 5.6 mm in width and 125 mm in length. An aluminum foil was used as the negative electrode foil 7. The surface enlarged parts 3 were formed on the negative electrode foil 7, and the dielectric film 5 was not formed. Cellulose fibers were used for the separator.

The capacitor element 6 using the electrode foil 1 of Example 1 and the capacitor element using the electrode foil of Comparative Example 1 were impregnated with an electrolyte solution, and housed in an exterior case with a cylindrical shape and a bottom, and a positive electrode terminal and a negative electrode terminal were drawn out and sealed with a sealing material. As the electrolyte solution, a γ-butyrolactone solution of an amidinium phthalate salt was used. Accordingly, the winding capacitor using the electrode foil 1 of Example 1 and the winding capacitor using the electrode foil of Comparative Example 1 were produced.

Figure 9:
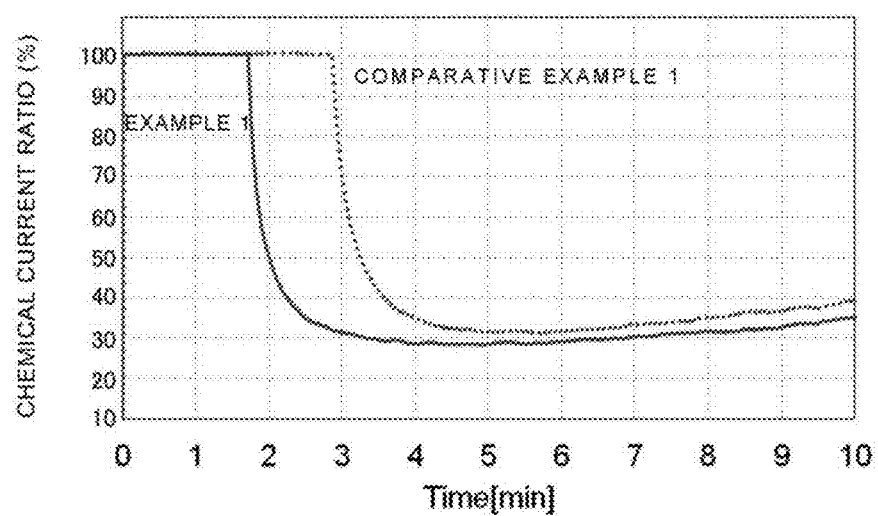
FIG. 9 is a graph showing a current that flew during an aging treatment of winding capacitors of Example 1 and Comparative Example 1 for each of elapsed times.
Figure 10:
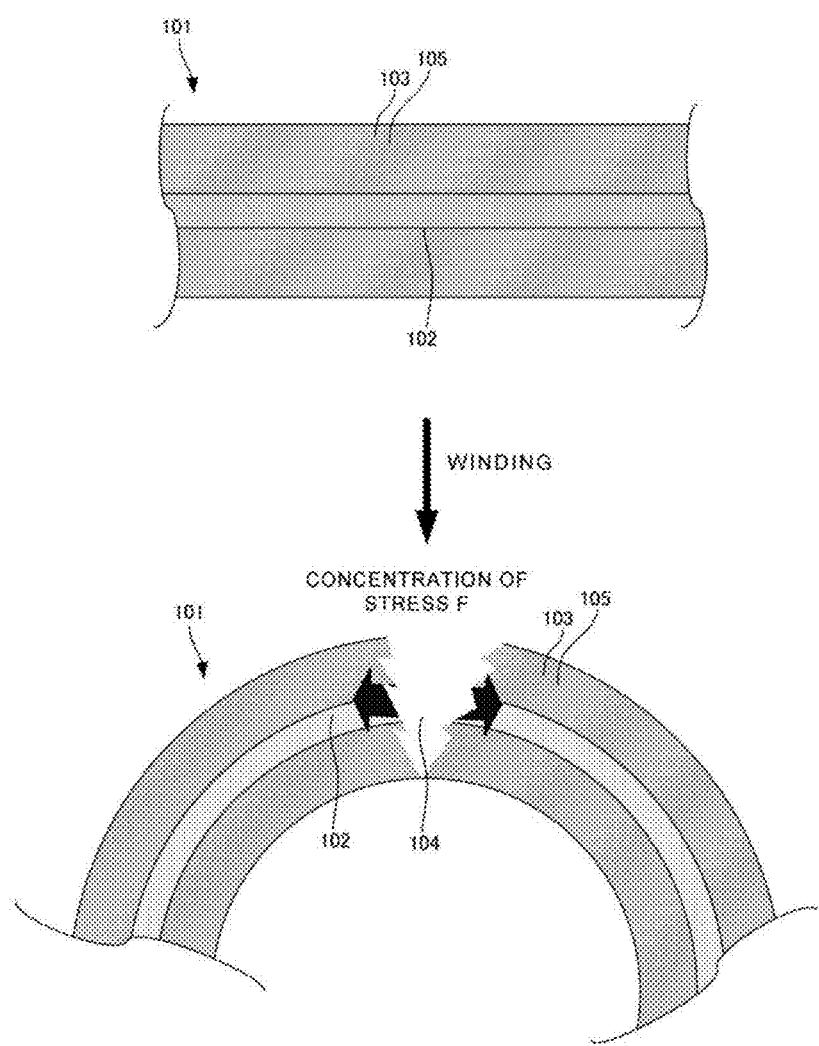
FIG. 10 is a cross-sectional view in a longitudinal direction of an electrode foil of the related art.

Both of the produced winding capacitors were subjected to an aging treatment, and a quantity of electricity required for the aging treatment was measured. The aging treatment was performed by applying a rated voltage under a temperature condition of 100° C. During the aging treatment, a change in current flowing between the positive electrode terminal and the negative electrode terminal was measured. Note that, a current values flown in both winding capacitors when the aging treatment started were the same. FIG. 9 is a graph shows a percentage of a current value at each of elapsed times from when the aging treatment started, in which a current value at the start of the aging treatment was set as 100%.

As shown in FIG. 9, in the winding capacitor using the electrode foil 1 of Example 1, the current value began to decrease before even 2 minutes had elapsed, and the current value decreased to about 30% of the current value at the start of the aging after about 3 minutes. On the other hand, in the winding capacitor using the electrode foil of Comparative Example 1, it was observed that the current value decreased after 2 minutes and just before 3 minutes, and it took about 5 minutes until the current value decreased to about 30% of the value at the start of the aging. That is, as shown in FIG. 9, it was confirmed that, in Example 1, the current value began to decrease more than 1 minute earlier than in Comparative Example 1, and from a product of a current value and a time when 5 minutes had elapsed from when the aging started, the winding capacitor using the electrode foil 1 of Example 1 had a quantity of electricity required for an aging treatment smaller than the winding capacitor using the electrode foil of Comparative Example 1.

REFERENCE SIGNS LIST

1 Electrode foil
2 Core part
3 Surface enlarged part
4 Separation part
5 Dielectric coating film
6 Capacitor element
7 Negative electrode foil
8 Separator
9 Winding core part

The invention claimed is:

1. An electrode foil, which is made of a belt-like foil, comprising:
   surface enlarged parts that are formed on a surface of the foil;
   a core part which is a part remained when excluding the surface enlarged parts within the foil;
   a plurality of separation parts that extends in a belt width direction in the surface enlarged parts, and divides the surface enlarged parts; and
   an dielectric film formed on surface of the surface enlarged parts, or on surfaces of the surface enlarged parts and the separation parts,
   wherein the separation parts are provided at intervals of an average pitch of 2.1 mm or less.

2. The electrode foil according to claim 1,
   wherein the separation parts extend to completely cross or partially cross the foil.

3. The electrode foil according to claim 1,
   wherein four or more of the separation parts are provided in a range of 10 mm in a belt longitudinal direction.

4. The electrode foil according to claim 1,
   wherein the separation parts are provided at intervals of an average pitch of 1.0 mm or less.

5. The electrode foil according to claim 1,
   wherein the separation parts are formed by cracking the surface enlarged part, and a groove width of when the foil is flat is substantially zero.

6. A winding capacitor comprising the electrode foil according to claim 1 that is wound thereon.

7. The winding capacitor according to claim 6, comprising a capacitor element obtained by winding the electrode foil,
   wherein the capacitor element includes a winding core part at the winding center,
   the electrode foil is wound around the winding core part, and
   the separation parts are formed at least on within the predetermined radius of the winding center-side including a start of the winding to the winding core part.

8. An electrode foil manufacturing method, comprising:
   a step of forming surface enlarged parts on a surface of a belt-like foil;
   a step of forming a plurality of separation parts that divide the surface enlarged parts extending in a belt width direction of the foil at intervals of an average pitch of 2.1 mm or less; and
   a step of forming an dielectric film on a surface of the surface enlarged parts, or on surfaces of the surface enlarged parts and the separation parts.

9. A winding capacitor manufacturing method comprising:
   an element forming step of forming a capacitor element by winding the electrode foil obtained by the manufacturing method according to claim 8;
   an electrolyte forming step of forming an electrolyte on the capacitor element; and
   an aging step of aging the capacitor element,
   wherein the aging step is performed after the electrolyte is formed in the electrolyte forming step, or the electrolyte is formed in the aged capacitor element in the electrolyte forming step after the aging step.

* * * * *